United States Patent
Kaneko et al.

[11] Patent Number: 5,143,809
[45] Date of Patent: Sep. 1, 1992

[54] COLOR TONER

[75] Inventors: Tadashi Kaneko; Shoichi Nakano; Yoshiaki Kobayashi; Takahira Kasuya, all of Hachioji, Japan

[73] Assignee: Konica Corporation, Tokyo, Japan

[21] Appl. No.: 625,963

[22] Filed: Dec. 11, 1990

[30] Foreign Application Priority Data

Dec. 15, 1989 [JP] Japan .................. 1-323914

[51] Int. Cl.⁵ .............................. G03G 9/087
[52] U.S. Cl. .................. 430/105; 430/106; 430/110
[58] Field of Search ................ 430/110, 106, 105

[56] References Cited

U.S. PATENT DOCUMENTS 4,585,723  4/1986  Kishi et al. .................. 430/110
4,656,112  4/1987  Kawagishi et al. .......... 430/110

Primary Examiner—John Goodrow
Attorney, Agent, or Firm—Jordan B. Bierman

[57] ABSTRACT

There is disclosed a color toner having an excellent fixability, an improved antioffset property and a superior transparency of an image fixed on an OHP sheet. The color toner comprises 100 parts by weight of a polyester resin prepared by condensation polymerization of the following components (1) and (2), 0.1 to 5 parts by weight of a zinc complex of an aromatic oxycarboxylic acid which may have a substituent, and 1 to 20 parts by weight of a colorant;

Component (1): diol represented by the following Formula (a):

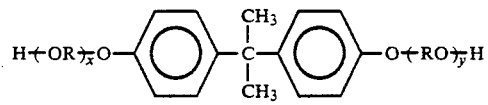

wherein R represents an ethylene group or a propylene group; and X and Y each are an integer, provided that the sum of X and Y is 2 to 7 in average:

Component (2): a mixture of a divalent acid component comprising a divalent carboxylic acid having an aliphatic hydrocarbon side chain of 3 to 22 carbon atoms or a lower alkyl ester thereof, and a trivalent acid component comprising a trivalent carboxylic acid or an anhydride thereof in a ratio of 10 to 50 mole % of the total acid components.

8 Claims, No Drawings

COLOR TONER

FIELD OF THE INVENTION

This invention relates to a color toner comprising a specific polyester resin, a specific zinc complex and a colorant and, particularly to a color toner suitable to form an OHP image in a heat roller fixing system.

BACKGROUND OF THE INVENTION

It is generally known that a linear polyester resin prepared by condensation polymerization of polyol with dicarboxylic acid has been used as a resin for a toner because of its sharp melting property, of which details are disclosed in Japanese Patent Publication Open to Public Inspection (hereinafter referred to as JP O.P.I. Publication) No. 50-63939/1975.

However, there exists a problem that when fixing the color toner comprising the above linear polyester resin with a heat-roller, an offset phenomenon is liable to take place by sticking of the fused toner to the heat roller.

There is known the technique for preventing an offset, in which sticking of the melted toner to the heat roller is prevented by coating silicone oil on the surface of the heat-roller.

In the above techniques, there are involved such incoveniences particularly in the case where the fixed image is formed on an OHP sheet comprising a polyester film, that the OHP sheet is contaminated by silicone oil adhering in a thin layer on the surface of a fixed image, which in turn results in contaminating fingers of an operator and other OHP sheets.

There is proposed another method for providing an antioffset property to a toner itself in JP O.P.I. Publication No. 57-37353/1982, in which the toner comprises the linear polyester resin having a crosslinking structure formed by using tricarboxylic acid in combination with diol and dicarboxylic acid.

A dye or a pigment contained in a color toner is sometimes liable to adversely affect a triboelectricity of a toner and therefore, a colorless charge controlling agent is added to the toner, of which examples are the organic metal complexes disclosed in JP O.P.I. Publication Nos. 57-104940/1982 and 57-124357/1982.

However, some of the above organic metal complexes have high reactivity to a polyester resin having a crosslinking structure, and combined use of such high reactive organic metal complexes and the polyester resins having the crosslinking structure were proved to cause the following problems:

(1) a charge control function of the organic metal complexes is spoiled, so that an image density is lowered and a background fog is produced;

(2) fixing is deteriorated by increase in the softening point of a toner;

(3) the incresed softening point of the toner deteriorates dispersibility of a colorant in a polyester resin, which in turn results in making a hue of a fixed image less sharp and lowering color developability of a multicolored image formed by superposing the colors because of lower transparency of the toner; and (4) lower transparency of an image formed on a transparent OHP sheet makes it difficult to project a sharp OHP image.

At present, it is the actual situation that there are available no organic metal complexes compatible with the polyester resin having the crosslinking structure.

SUMMARY OF THE INVENTION

It is an object of the invention to provide a color toner satisfying the following requirements:

(1) a color image having a high density and no background fog can be formed;

(2) an excellent fixation with a heat roller can be achieved without causing any offset phenomena;

(3) there can be formed a color image having a clear hue, a high transparency and an excellent color developability due to an excellent dispersibiliy of a colorant; and (4) a sharp and clear color image having a high transparency can be formed on an OHP sheet.

The above objects of the invention can be achieved by a color toner comprising 100 parts by weight of a polyester resin prepared by condensation polymerization of the following components (1) and (2) (hereinafter referred to as the specific polyester resin), 0.1 to 5 parts by weight of a zinc complex (hereinafter referred to as the specific zinc complex) of an aromatic oxycarboxylic acid which may have a substituent, and 1 to 20 parts by weight of a colorant;

Component (1): diol represented by the following Formula (a):

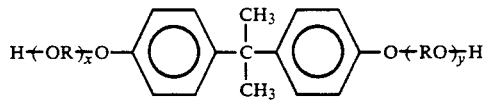

wherein R represents an ethylene or propylene group; and x and y are each an integer, provided that the sum of x and y is 2 to 7 in average;

Component (2): the mixture of a divalent acid component comprising a divalent carboxylic acid having the aliphatic hydrocarbon side chain of 3 to 22 carbon atoms or the lower alkyl ester thereof, and a trivalent acid component comprising a trivalent carboxylic acid or the anhydride thereof in the proportion of 10 to 50 mol % of the total acid components.

In the invention, the combination of the specific polyester resin and the specific zinc complex in the specific proportion suppresses the reaction therebetween only to a negligible level and makes it possible to prevent the softening point from increasing, satisfactorily display the charge control functions of the specific zinc complex and improve a dispersibility of the colorant in a resin

DETAILED DESCRIPTION OF THE INVENTION

The above specific polyester resin is prepared by condensation polymerization of at least the foregoing components (1) and (2).

The component (1) is diol represented by the foregoing Formula (a), of which examples are polyoxypropylene(2.2)-2,2-bis(4-hydroxyphenyl)propane, polyoxypropylene(3.3)-2,2-bis(4-hydroxyphenyl)propane, polyoxyethylene (2.0)-2,2-bis(4-hydroxyphenyl)propane, and polyoxypropylene(2.0)-polyoxyethylene(2.0)-2,2-bis(4-hydroxyphenyl)propane.

The examples of the divalent carboxylic acids having the aliphatic hydrocarbon side chain of 3 to 22 carbon atoms or the lower alkyl esters thereof in the component (2), are n-dodecenyl succinic acid, isododecenyl succinic acid, n-dodecyl succinic acid, isododecyl succinic acid, isooctyl succinic acid, n-octyl succinic acid, n-butyl succinic acid, and the esters thereof. The above components are added in a proportion of 1 to 50 mol %, preferably 10 to 30 mol % of the total monomer components. The branched side chains can be introduced into the principal chain of a polyester resin by the above components, and increase in a softening point can be inhibited.

The examples of the other divalent carboxylic acids or lower alkyl esters thereof in the component (2) are maleic acid, fumaric acid, mesaconic acid, citraconic acid, itaconic acid, glutaconic acid, phthalic acid, isophthalic acid, terephthalic acid, cyclohexanedicarboxylic acid, succinic acid, adipic acid, sebacic acid, malonic acid, a dimer of linolenic acid, and the lower alkyl esters thereof.

The examples of the trivalent carboxylic acids or the anhydrides thereof in the component (2) are 1,2,4-benzenetricarboxylic acid, 1,2,5-benzenetricarboxylic acid, 1,2,4-cyclohexanetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxy-2-methylcarboxy propene, 1,3-dicarboxy-2-methyl-2-methylcarboxy-propanetetra(methylenecarboxy)methane, enpol trimeric acid, and the anhydrides thereof. Among them, 1,2,4-benzenetricarboxylic anhydride is preferable.

In the component (2), the trivalent acid component comprising trivalent carboxylic acid or the anhydride thereof is added in the proportion of 10 to 50 mol % of the total acid components. The proportion falling within the above range can improve antioffset and fixing properties. The proportion lower than the above limit deteriorates the antioffset property. The proportion exceeding the above limit deteriorates a fixing property due to increase in a softening point.

The examples of the catalysts used for polymerization of the specific polyester resin are tin oxide, zinc oxide, titanium oxide, dibutyltin dilaurate and dibutyltin oxide.

The polyols used for preparing the specific polyester resin may include the other polyols in the proportion of not more than 10 mol % of the total polyol components. The example thereof are ethylene glycol, diethylene glycol, triethylene glycol, 1,2-propylene glycol, 1,3-propylene glycol, 1,4-butanediol, neopentyl glycol, 1,4-butenediol, 1,4-bis(hydroxymethyl)cyclohexane, bisphenol A, pentaerythritol, and hydrogenated bisphenol A.

The softening point of the specific polyester resin is preferably 120° to 160° C. The softening point falling within the above range improves antioffset and fixing properties.

In the foregoing specific zinc complex, the examples of the aromatic oxycarboxylic acid which may have a substituent are salicylic acid, salicylic acid having the alkyl side chain with 4 to 9 carbon atoms [hereinafter referred to as alkyl ($C_4$–$C_9$)], 3,5-dialkyl ($C_4$–$C_9$) salicylic acid, 2-hydroxy-3-naphthoic acid, alkyl ($C_4$–$C_9$)-2-hydroxy-3-naphthoic acid, 5,6,7,8-tetrahydro-2-hydroxy-3-naphthoic acid, alkyl ($C_4$–$C_9$)-5,6,7,8-tetrahydro-2-hydroxy-3-naphthoic acid, 1-hydroxy-2-naphthoic acid, alkyl ($C_4$–$C_9$)-1-hydroxy-2-naphthoic acid, 5,6,7,8-tetrahydro-1-hydroxy-2-naphthoic acid and 8-hydroxy-1-naphthoic acid.

The specific zinc complexes can be prepared in the following manner. Sufficient alkali is added to aromatic oxycarboxylic acid to dissolve it in water. Then, a zinc product is added to the solution in a mole ratio of 1:2, and the solution is heated to promote the reaction at regulated pH. The precipitates are filtered and washed well, followed by drying. The obtained product is presumably represented by the following Formula 1:

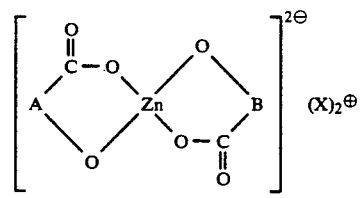

wherein A and B each represent an aromatic ring of aromatic oxycarboxylic acid; and X represents a paired ion.

In the above formula 1, the paired ion can be changed according to the conditions of an after-treatment. For example, where pH of the solution is adjusted to not higher than 3 before filtering, and washing is carried out until pH of the solution ater washing becomes 6 to 7, the paired ion is hydrogen ion. Where the pH is adjusted to neutral or higher with an alkali, the paired ion is an alkali metal ion. Where treating it with a hydrochloride salt of amine, the paired ion is an ammonium salt ion.

The commercial product of the specific zinc complex is Bontron E-84 manufactured by Orient Chemical Co.

The color toner of the invention comprises the specific zinc complex of 0.1 to 5 parts by weight and the colorant of 1 to 20 parts by weight per 100 parts by weight of the specific polyester resin.

The proportion of the specific zinc complex falling within the above range can prevent the softening point of the specific polyester resin from increasing and can demonstrate well a charge controlling function of the specific zinc complex. The proportion smaller than the above limit is liable to prevent the charge controlling function from satisfactorily displaying, so that the electrification of the toner becomes unstable. On the contrary, the proportion exceeding the above limit is liable to promote the reaction of the specific polyester resin to increase the softening point of the toner, so that fixing thereof is deteriorated.

The examples of the colorants used in the invention are dyes and pigments including carbon black, phthalocyanine blue, quinacridone magenta, perylene red, benzidine yellow, nigrosine dye, aniline blue, chalcoil blue, chromium yellow, ultramarine blue, DuPont oil red, quinoline yellow, methylene blue chloride, malachite green oxalate, lamp black, and rose bengal. These colorants may be used independently or in combination.

The color toner of the invention can be prepared in such a manner as described below. After mixing the specific polyester resin, the specific zinc complex and the colorant with a ball mill, the mixture is kneaded, pulvelized and classified to obtain the powder. The powder may be used as color toner either as it is or after further adding thereto an additive such as the hydrophobic fine silica particles and then mixing with a tubular mixer.

The color toner of the invention may contain wax so as to further improve a fixing property. The preferable wax is a low molecular weight polyethylene or polypropylene wax each having the softening point of 120° to 160° C. The commercial products of such wax are Biscol 550P and 660P manufactured by Sanyo Chemical Industries Co.

The examples of the carriers used in combination with the color toner of the invention are coating carriers comprising the magnetic particles such as ferrite coated thereon with a styrene-acryl copolymer resin.

EXAMPLES

The invention will be detailed with reference to the examples. Parts mean parts by weight.

Preparation of Polyester Resin (1) Polyester Resin A (Invention)

| | |
|---|---|
| Polyoxypropylene (2,2)-2,2-bis(4-hydroxyphenyl)propane | 700 g |
| Fumaric acid | 150 g |
| n-Dodecenyl succinic anhydride | 55.4 g |
| Hydroquinone | 0.1 g |

The above substances were put in the 1 l round flask equipped with a thermometer, a stainless steel stirrer, a glass tube for introducing nitrogen gas, and a reflux condenser. Nitrogen gas was introduced into the flask set on a mantle heater from the nitrogen gas introduction tube to keep the inside of the flask innert. The temperature inside the flask was raised to 250° C. to carry out the reaction with stirring. The acid value was 1.5 at the point where reaction water stopped flowing out.

Next, 65.4 g of 1,2,4-benzenetricarboxylic anhydride in the proportion of 19.0 mol % of the total acid components were added to the flask to continue further the reaction for about 8 hours. The reaction was terminated when the acid value was 20 to obtain the polyester resin A.

The softening point was 130° C.

(2) Polyester Resin B (Invention)

| | |
|---|---|
| Polyoxyethylene (2)-2,2-bis(4-hydroxyphenyl)propane | 650 g |
| Fumaric acid | 120 g |
| Isododecenyl succinic anhydride | 55.4 g |

The above substances were subjected to reaction at 220° C. in the same manner as in the polyester resin A. The acid value was 1.5 at the point where reaction water did not flow out.

Next, 79 g of 1,2,4-benzenetricarboxylic anhydride in the proportion of 25.6 mol % of the total acid components were added to the reaction vessel to continue further the reaction, which was terminated at the point where the softening point reached 135° C. to obtain the polyester resin B.

(3) Polyester Resin A (Comparison)

| | |
|---|---|
| Polyoxyethylene (2)-2,2-bis(4-hydroxyphenyl)propane | 650 g |
| Fumaric acid | 120 g |
| Isododecenyl succinic anhydride | 55.4 g |

The above substances were subjected to reaction at 200° C. in the same manner as in the polyester resin A after adding 0.05 g of dibutyl tin oxide. The reaction was terminated at the point where the softening point reached 141° C. to obtain the comparative polyester resin a.

(4) Polyester Resin B (Comparison)

| | |
|---|---|
| Polyoxypropylene (2,2)-2,2-bis(4-hydroxyphenyl)propane | 211 g |
| Terephthalic acid | 299 g |
| Pentaerythritol | 82 g |

The above substances were subjected to reaction in the same manner as in the polyester resin a. The acid value was 1.8 at the point where reaction water stopped flowing out, Then, 384 g of 1,2,4-benzenetrisulfonic anhydride in the proportion of 52.6 mol % of the total acid components were added to the reaction vessel to continue further the reaction. The reaction was terminated at the point where the softening point reached 145° C. to obtain the comparative polyester resin b.

EXAMPLE 1

The following components were subjected to the ordinary processing steps comprising mixing, melting, kneading, cooling, pulverizing and classifying to prepare the color toner T 1 having the average particle size of 11 μm.

| | |
|---|---|
| Polyester resin A | 100 parts |
| Polypropylene wax, Biscol 550P manufactured by Sanyo Chemical Softening point: 150° C. | 4 parts |
| Phthalocyanine pigment, KET-Blue 104 manufactured by Dai Nippon Ink Chemical Co. | 5 parts |
| Specific zinc complex, Bontron E-84 manufactured by Orient Chemical Co. | 2 parts |

EXAMPLE 2

The same components as in Example 1 were treated in the same manner as in Example 1 to prepare the color toner T 2, except that the polyester resin A was replacd with the polyester resin B and the specific zinc complex was replaced with the one represented by the following Formula A.

EXAMPLE 3

The same components as in Example 1 were treated in the same manner as in Example 1 to prepare the color toner T 3, except that the specific zinc complex was replaced with the one represented by the following Formula B.

EXAMPLE 4

The same components as in Example 3 were treated in the same manner as in Example 3 to prepare the color toner T 4, except that the polyester resin A was replaced with the polyester resin B.

COMPARATIVE EXAMPLE 1

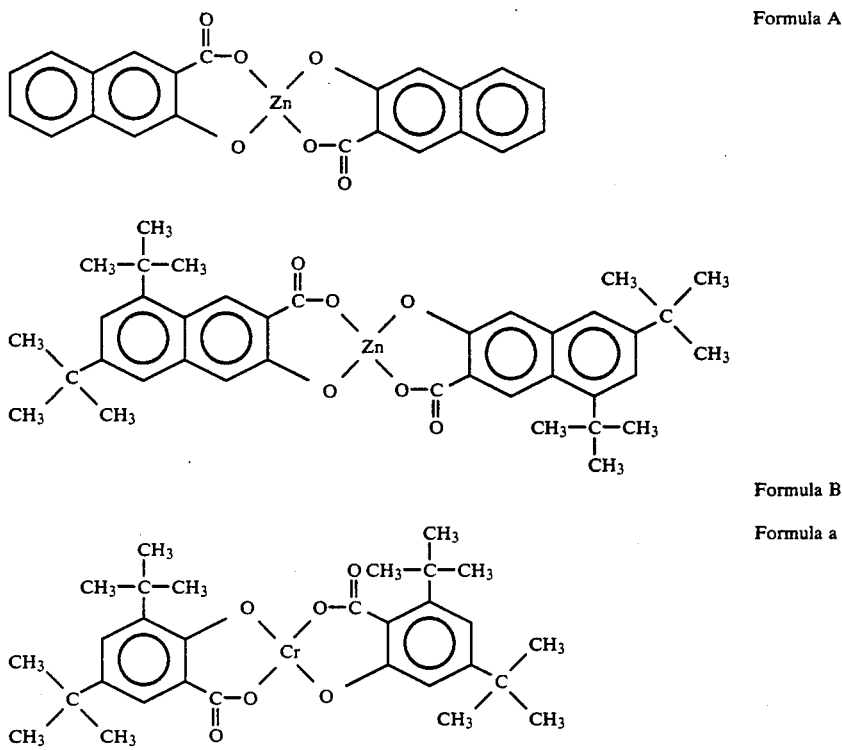

Formula A

Formula B

Formula a

The following components were treated in the same manner as in Example 1 to prepare the color toner t 1.

| | |
|---|---|
| Polyester resin a (Comparison) | 100 parts |
| Polypropylene wax, Biscol 550P | 4 parts |
| Phthalocyanine pigment, KET-Blue 104 | 5 parts |
| Specific zinc complex A | 2 parts |

COMPARATIVE EXAMPLE 2

The same components as in Comparative Example 1 were treated in the same manner as in Comparative Example 1 to prepare the comparative color toner t 2, except that the polyester resin a was replaced with the polyester resin b.

COMPARATIVE EXAMPLE 3

The same components as in Comparative Example 1 were treated in the same manner as in Comparative Example 1 to prepare the comparative color toner t 3, except that the specific zinc complex was replaced with the one represented by Formula B.

COMPARATIVE EXAMPLE 4

The same components as in Comparative Example 3 were treated in the same manner as in Comparative Example 3 to prepare the comparative color toner t 4, except that the polyester resin a was replaced with the polyester resin b.

COMPARATIVE EXAMPLE 5

The same components as in Example 1 were treated in the same manner as in Example 1 to prepare the comparative color toner t 5, except that the specific zinc complex was replaced with the one represented by Formula a.

Preparation of Developer

To each 100 g of the toners prepared in the above examples and comparative examples was added 0.4 g of a fine hydrophobic silica Aerosil R-972 manufactured by Japan Aerosil Co. to mix with a Henschel mixer.

Next, there were mixed each 40 g of the above mixtures and 360 g of the carrier prepared by coating ferrite having the average particle size of 40 μm with a styrene-acryl copolymer resin to prepare the developers for copying test.

Copying Test

The copying tests of the above developers were carried out under the conditions of 20° C. and 60% RH with a copier, Konica 8010 equipped with a heat roller fixer, and the maximum image density Dm and the background fog $D_{fog}$ were measured with a densitometer.

The triboelectric property of the toners was measured with E-Spart Analyzer manufactured by Hosokawa Micron Co.

Fixing Test

The fixed images were formed in the same manner as in the above copy tests, except that the temperature of the upper roller in the heat roller fixer was set at 140° C. and that of the lower roller at 100° C.

The solid part of each fixed image was subjected to a rubbing test by rubbing the surface thereof 10 times with a JK wiper manufactured by Jujo-Kimberley Co. Fixability was evaluated by the ratio of $D_{m2}/D_{m1}$, in which $D_{m1}$ is the image density before the rubbing test and $D_{m2}$ is the image density after the same test. The higher the ratio of $D_{m2}/D_{m1}$, the more excellent the fixing property.

Evaluation of OHP Images

An image was fixed on the OHP sheet Kimolec #400M manufactured by Kimoto Co. with a copier Konica 8010 in the OHP image fixing mode.

The transmittance of the fixed images at 400 nm was measured.

The results of the above tests are shown in Table 1.

TABLE 1

| | Color toner | Tsp of polyester resin | Tsp of toner | Fix-ability | Offset | OHP trans-mittance | Maximum density, $D_m$ | Back-ground fog, $D_{fog}$ | Charge on toner |
|---|---|---|---|---|---|---|---|---|---|
| Inventive Example 1 | Toner T1 | 135° C. | 135° C. | 0.93 | Not produced | 57% | 1.35 | 0.00 | 15.7 µC/g |
| Inventive Example 2 | Toner T2 | 141° C. | 141° C. | 0.89 | Not produced | 52% | 1.37 | 0.00 | 16.5 µC/g |
| Inventive Example 3 | Toner T3 | 135° C. | 135° C. | 0.92 | Not produced | 45% | 1.29 | 0.00 | 14.8 µC/g |
| Inventive Example 4 | Toner T4 | 141° C. | 141° C. | 0.94 | Not produced | 49% | 1.34 | 0.01 | 13.2 µC/g |
| Comparative Example 1 | Toner t1 | 123° C. | 123° C. | 0.98 | Produced | 3% | 1.32 | 0.02 | 14.9 µC/g |
| Comparative Example 2 | Toner t2 | 145° C. | 145° C. | 0.97 | Produced | 5% | 1.33 | 0.01 | 15.7 µC/g |
| Comparative Example 3 | Toner t3 | 135° C. | 135° C. | 0.37 | Not produced | 13% | 0.98 | 0.02 | 12.4 µC/g |
| Comparative Example 4 | Toner t4 | 141° C. | 141° C. | 0.47 | Not produced | 11% | 0.78 | 0.01 | 13.5 µC/g |
| Comparative Example 5 | Toner t5 | 135° C. | 175° C. | 0.25 | Not produced | 2% | 0.65 | 0.35 | 7.5 µC/g |

Tsp: Softening point

As is obvious from Table 1, the developers comprising the color toners of the invention can provide the color images having the more excellent antioffset property and fixability as well as the higher image density and less background fog, especially much higher transmittance of the OHP images, than those of the comparative toners.

What is claimed is:

1. A color toner comprising 100 parts by weight of a polyester resin prepared by condensation polymerization of the following components (1) and (2), 0.1 to 5 parts by weight of a zinc complex of an aromatic oxycarboxylic acid which may have a substituent, and 1 to 20 parts by weight of a colorant;

Component (1): diol represented by the following Formula (a):

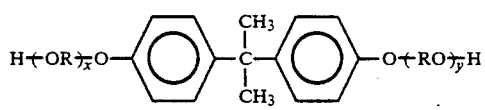

wherein R represents an ethylene group or a propylene group; and X and Y each represent an integer, provided that a sum of X and Y is within a range of 2 to 7 in average:

Component (2): a mixture of a divalent acid component comprising a divalent carboxylic acid having an aliphatic hydrocarbon side chain of 3 to 22 carbon atoms or a lower alkyl ester thereof, and a trivalent acid component comprising a trivalent carboxylic acid or an anhydride thereof in a ratio of 10 to 50 mole % of the total acid components.

2. The color toner of claim 1, wherein the diol represented by Formula (a) is selected from polyoxypropylene (2.2)-2,2-bis (4-hydroxyphenyl) propane, polyoxypropylene (3.3)-2,2-bis (4-hydroxyphenyl) propane, polyoxyethylene (2.0)-2,2-bis (4-hydroxyphenyl) propane, and polyoxypropylene (2. 0) polyoxyethylene (2. 0)-2,2-bis (4-hydroxyphenyl) propane.

3. The color toner of claim 1, wherein the divalent carboxylic acid having an aliphatic hydrocarbon side chain of 3 to 22 carbon atoms or the lower alkyl ester thereof is selected from 1,2,4-benzenetricarboxylic acid, 1,2,5-benzenetricarboxylic acid, 1,2,4-cyclohexanetricarboxylic acid, 2,5,7-naphthalentricarboxylic acid, 1,2,4-naphthalentricarboxylic acid, 1, 2,4-butanetricarboxylic acid, 1,2,5-hexanetricarboxylic acid, 1,3-dicarboxy-2-methylcarboxy propene, 1,3-dicarboxy-2-methyl-2-methylcarboxy-propane-tetra(methyenecarboxy) methane, enpol trimeric acid, and anhydrides thereof.

4. The color toner of claim 3, wherein the divalent carboxylic acid is 1,2,4-benzenetricarboxylic anhydride.

5. The color toner of claim 1, wherein the aromatic oxycarboxylic acid is selected from salicylic acid, 3,5-dialkyl salicylic acid, 2-hydroxy-3-naphthoic acid, alkyl-2-hydroxy3-naphthoic acid, 5,6,7,8-tetrahydro-2-hydroxy-3-naphthoic acid, alkyl-5,6,7,8-tetrahydro-2-hydroxy-3-naphthoic acid, 1-hydroxy-2-naphthoic acid, alkyl-1-hydroxy-2-naphthoic acid, 5,6,7,8-tetrahydro-1-hydroxy-2-naphthoic acid, 8-hydroxy -1-naphthoic acid, wherein the alkyl group has 4 to 9 carbon atoms.

6. The color toner of claim 1, wherein a softening point of the polyester resin is 120° to 160° C.

7. The color toner of claim 3, wherein the divalent carboxylic acid or the lower alkyl ester thereof is added in a proportion of 1 to 50 mol % of the total monomer components.

8. The color toner of claim 7, wherein the proportion is 10 to 30 mol %.

* * * * *